US011176004B2

(12) United States Patent
Kottler et al.

(10) Patent No.: US 11,176,004 B2
(45) Date of Patent: Nov. 16, 2021

(54) TEST CONTINUOUS LOG REPLAY

(71) Applicant: SAP SE, Walldorf (DE)

(72) Inventors: Stephan Kottler, Gaggenau (DE);
Martin Heidel, Walldorf (DE); Peter Steinemann, Mannheim (DE);
Thorsten Glebe, Leimen (DE);
Johannes Haeussler, Laudenbach (DE)

(73) Assignee: SAP SE, Walldorf (DE)

( * ) Notice: Subject to any disclaimer, the term of this patent is extended or adjusted under 35 U.S.C. 154(b) by 309 days.

(21) Appl. No.: 16/371,889

(22) Filed: Apr. 1, 2019

(65) Prior Publication Data
US 2020/0310925 A1 Oct. 1, 2020

(51) Int. Cl.
*G06F 16/00* (2019.01)
*G06F 11/00* (2006.01)
(Continued)

(52) U.S. Cl.
CPC ...... *G06F 11/1471* (2013.01); *G06F 11/1474* (2013.01); *G06F 16/20* (2019.01);
(Continued)

(58) Field of Classification Search
CPC .............. G06F 16/2365; G06F 16/211; G06F 16/2379; G06F 16/217; G06F 16/2455; G06F 16/1469; G06F 16/27; G06F 16/273; G06F 16/2358; G06F 16/2343; G06F 16/24556; G06F 11/1474; G06F 11/1471; G06F 11/2023; G06F 11/2041; G06F 2201/80; G06F 2201/82; G06F 16/20; G06F 16/221

See application file for complete search history.

(56) References Cited

U.S. PATENT DOCUMENTS

| | | | |
|---|---|---|---|
| 7,003,694 B1* | 2/2006 | Anderson, Jr. ...... | G06F 11/2023 707/999.202 |
| 7,222,136 B1* | 5/2007 | Brown ................ | G06F 16/2358 707/683 |

(Continued)

FOREIGN PATENT DOCUMENTS

| | | | |
|---|---|---|---|
| EP | 0250847 A2 * | 1/1988 | |
| WO | WO1998040827 A1 * | 9/1998 | |

(Continued)

OTHER PUBLICATIONS

Hu Wan et al., "Empirical Study of Redo and Undo Logging in Persistent Memory", 5th Non-Volatile Memory Systems and Applications Symposium (NVMSA), Aug. 2016, pp. 1-6.*

*Primary Examiner* — Srirama Channavajjala
(74) *Attorney, Agent, or Firm* — Mintz Levin Cohn Ferris Glovsky and Popeo, P.C.

(57) ABSTRACT

A method, a system, and a computer program product for performing testing of continuous log replays in a database system. A redo log generated for a data record in a database is received. The redo log is indicative of a change in persistency of the data record in the database. Based on the change in persistency recorded in the redo log, a redo handler in the plurality of handlers is selected for execution of a replay of the received redo log. Using the selected redo log, replay of the redo log is executed to generate a state of the data record prior to the change in persistency recoded in the redo log.

11 Claims, 10 Drawing Sheets

(51) Int. Cl.
*G06F 11/14* (2006.01)
*G06F 16/23* (2019.01)
*G06F 16/20* (2019.01)
*G06F 16/22* (2019.01)

(52) U.S. Cl.
CPC ........ *G06F 16/221* (2019.01); *G06F 16/2365* (2019.01); *G06F 2201/80* (2013.01); *G06F 2201/82* (2013.01)

(56) References Cited

U.S. PATENT DOCUMENTS

| | | | | |
|---|---|---|---|---|
| 7,730,044 B2* | 6/2010 | Hanus | ................ | G06F 16/2219 707/695 |
| 9,569,497 B2* | 2/2017 | Kottler | .............. | G06F 16/24556 |
| 9,594,794 B2* | 3/2017 | Gutlapalli | ........... | G06F 16/2358 |
| 10,366,152 B2* | 7/2019 | Grimm | .................. | G06F 16/20 |
| 10,437,721 B2* | 10/2019 | Leshinsky | ........... | G06F 12/0253 |
| 10,824,519 B2* | 11/2020 | Heidel | .............. | G06F 16/24553 |
| 2004/0034619 A1* | 2/2004 | Lu | .............. | G06F 7/00 |
| 2005/0125430 A1* | 6/2005 | Souder | .................... | G06F 16/27 |
| 2005/0216462 A1* | 9/2005 | Xiao | .................. | G06F 16/2343 |
| 2007/0061383 A1* | 3/2007 | Ozawa | ................ | G06F 11/2041 |
| 2012/0310985 A1* | 12/2012 | Gale | .................... | G06F 16/273 707/792 |
| 2012/0323849 A1* | 12/2012 | Garin, Jr. | ................ | G06F 16/27 707/617 |
| 2014/0122439 A1* | 5/2014 | Faerber | ................ | G06F 16/221 707/683 |
| 2016/0147786 A1* | 5/2016 | Andrei | ................ | G06F 16/1756 707/695 |
| 2018/0144015 A1* | 5/2018 | Mittur Venkataramanappa | .......... | G06F 11/1471 |

FOREIGN PATENT DOCUMENTS

WO  WO2003009139 A1 *  1/2003
WO  WO2014150538     *  9/2014

* cited by examiner

TEST CONTINUOUS LOG REPLAY

TECHNICAL FIELD

This disclosure relates generally to data processing and, in particular, to test continuous log replay.

BACKGROUND

Database management systems have become an integral part of many computer systems. These systems handle hundreds of thousands of transactions per second. Transactions include addition, modification, deletion and/or any other manipulation of data records. When a transaction is executed, a log is created. Logs keep record of a specific action that may have been performed as part of the transaction, allow analysis of a transaction, and, if necessary, perform undo/redo of the transaction. When logs are replayed, the database systems may be put in a particular state to allow for point-in-time recovery, crash-restart, etc. In view of the complexity and size of the database systems, log replays may be slow processes that depend on a particular way specific redo records are written and typically require taking systems offline. Thus, in view of some of these issues, the underlying databases face challenges in order to optimize performance.

SUMMARY

In some implementations, the current subject matter relates to a computer implemented method for performing testing of continuous log replays in a database system. The method may include receiving a redo log generated for a data record in a database, the redo log being indicative of a change in persistency of the data record in the database, selecting, based on the change in persistency recorded in the redo log, a redo handler in the plurality of handlers for execution of a replay of the received redo log, and executing, using the selected redo log, replay of the redo log to generate a state of the data record prior to the change in persistency recoded in the redo log.

In some implementations, the current subject matter can include one or more of the following optional features. The data record may be a table in the database. The change in persistency may include at least one of the following actions: a modification of the data record, an insertion of the data record, a deletion of the data record, an addition of a column to the data record, and any combination thereof.

In some implementations, the change in persistency may include a registered action for a predetermined table stored in the database that may be performed at an arbitrary point in time during recovery of the predetermined table. Then, the selection of a particular handler may include selecting a first redo handler to perform the registered action on the predetermined table. A second redo handler may be selected to perform any other non-registered actions.

In some implementations, the registered action may include at least one of the following: a loading of the predetermined table, an unloading of the predetermined table, a locking of the predetermined table, and any combination thereof. The selection of a redo handler may further include selecting the second redo handler to perform an additional action not contained in the received redo log. A third redo handler may be selected to perform all other actions in the received redo log. The additional action may include at least one of the following: skipping one or more received redo records, changing order of one or more received redo records, modifying one or more received redo records, deleting at least a portion of one or more received redo records, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter relate to methods, systems, articles of manufacture, and the like that can, among other possible advantages, provide an ability to continuously perform testing of log replay within a database system.

Figure 1:
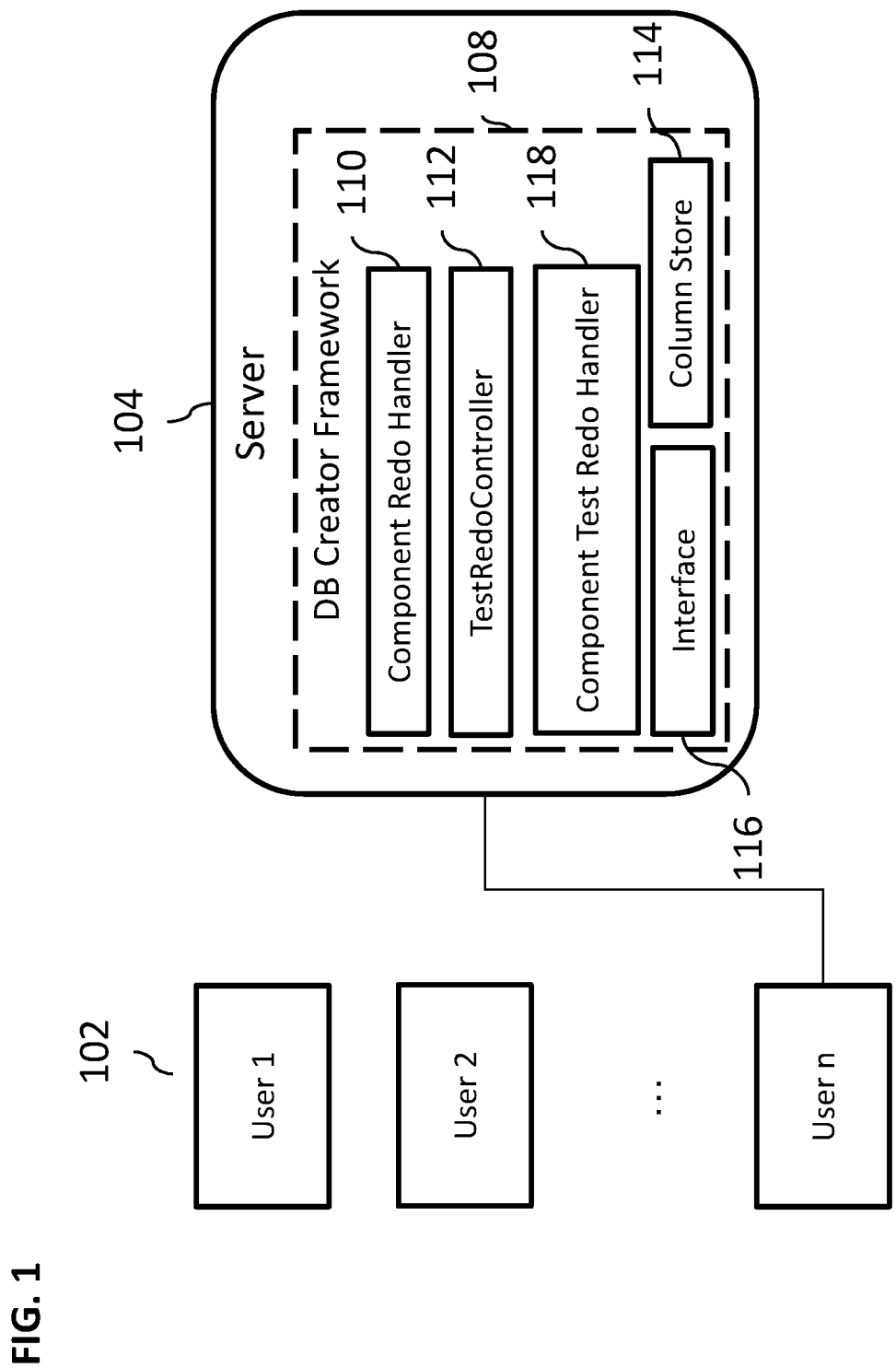
FIG. 1 illustrates an exemplary system for performing testing of continuous log replays in a database system, according to some implementations of the current subject matter.

FIG. 1 illustrates an exemplary system 100 for performing testing of continuous log replays in a database system, according to some implementations of the current subject matter. Components and/or users of the system 100 may be any type of hardware, software, and/or any combination of both. A component of the system 100 may further include entire computing systems that may have its own libraries, user interface elements, deployment parameters and/or systems, lifecycles, operation and support processes, etc. For example, the system 100 may be implemented in various in-memory database systems, such as a High Performance Analytic Appliance ("HANA") system as developed by SAP SE, Walldorf, Germany, as will be discussed in further detail below.

As shown in FIG. 1, the system 100 may include one or more users 102, and/or one or more servers 104. The users 102 and/or servers 104 may be communicatively coupled using any type of communication connection, which may include, but is not limited to, wired, wireless, and/or a combination of both network(s). The networks may include various local area networks (LAN), wide area networks (WAN), metropolitan area networks (MAN), virtual private networks (VPN), virtual local area networks (VLAN), and/or any combination thereof.

Further, each of the users 102 and/or servers 104 may be any type of computing systems, computing components, software, hardware, cloud computing systems, etc., and/or any combination thereof. In some exemplary implementations, the servers 104 may include SQL servers and/or may be part of one or more databases and/or communicatively coupled to one or more databases. The servers 104 may further include a database ("DB") creator framework 108 that may include one or more Component Redo Handler instances 110 (as discussed in connection with FIG. 2 below), one or more redo controlling components 112 (i.e., TestRedoController, as discussed in connection with FIGS. 3-4 below), and one or more Component Test Redo Handler instances 118 (as discussed in connection with FIGS. 5-6 below). The DB creator framework 108 may include a column store ("CS") structure 114. It may also include one or more interfaces 116 that may be used for registration, subscription/un-subscription of certain actions contained in redo logs concerning database table records.

The database creator framework 108 may allow creation of one or more databases. In some implementations, the DB creator framework may exist only during testing of database functionalities (e.g., it may or may not exist in production environments and may be configured to "replace" the database during testing (as shown by dashed lines in FIG. 1). The databases may include various data that may be arranged in one or more tables. The stored data may be modified through one or more data manipulation language ("DML") processes, which may include one or more operations, including but not limited to, INSERT (e.g., insertion of data into an existing data at a predetermined offset or location), UPDATE (e.g., modification of stored data), and DELETE (e.g., deletion of stored data). Additionally, the stored data may be affected using various data definition language ("DDL") statements, which may include creation of various schema for data storage.

In some implementations, a column store structure may provide data access for all applicable physical operators as part of life cycle management for an individual database record. The column store structure may include a first layer structure that may be configured to accept all incoming data requests and store them in a write-optimized manner (for example, preserving the logical row format of a record). This layer may be optimized for insert, delete, field update, etc. actions. The column store structure may also include a second layer structure that may be organized in a specialized column store format. The second layer structure may implement a dictionary encoding to ensure a better memory usage. The column store structure may also include a main store, where data values within a column may be represented and stored using a position in a sorted dictionary. A rowid for any incoming record may be generated when record is transmitted to the system for storage. A log is also created for a row to account for update, insert, delete, etc. operations and/or any bulk load operations. The column store may provide a transparent record propagation from write storage to read storage.

The communication connections between components of the system 100 may provide requisite communication capabilities. In some exemplary implementations, the communication connections may serve to transmit various requirements, instructions, user interface components, application program interface ("API") components, etc. to the DB creator framework 108. In some implementations, the DB creator framework 108 may include one or more servers, processors, memory locations, cloud computing components/systems, etc. that may be used during creation of databases, testing, redo of operations, creation of logs, etc.

When database records are created, modified, deleted, the system 100 may generate various logs that may include various information about actions that may have been executed by the system 100. The logs may be important to ensure integrity, synchronization, etc. of the records, databases, etc. A column store redo handler component 110 (e.g. Component Redo Handler) may be used to generate such redo logs. The Component Redo Handler 110 may include any type of computing system, computing component, software, hardware, cloud computing system, etc., and/or any combination thereof. In some implementations, the DB creator framework 108 may provide a log replay (also, referred to as "logreplay") functionality.

During operation of a database system (e.g., HANA (as developed by SAP SE, Walldorf, Germany)), there may be one or more DML and/or DDL operations that may be executed concurrently (while obeying the atomicity, consistency, isolation, and durability ("ACID") properties). All actions that modify persistency of the database write one or more redo records. When logreplay functionality is executed, the redo records may be replayed to place that database into a predetermined state (e.g., prior to insertion of a record into the database). The logreplay functionality may be used during crash-restart of a computing system, point-in-time recovery of the computing system, in high-availability secondary systems, Active/Active systems, and/or any other types of systems and/or for any other purposes. Redo records may be written for different layers and/or components in the database. In the DB creator framework, a redo handler (e.g., redo handler 110 as shown in FIG. 1) may be used to handle various types of redo records during execution of the logreplay functionality. All redo records of different types may first be encountered as a single stream (e.g., in sequential order or as records from a concurrent action).

Figure 2:
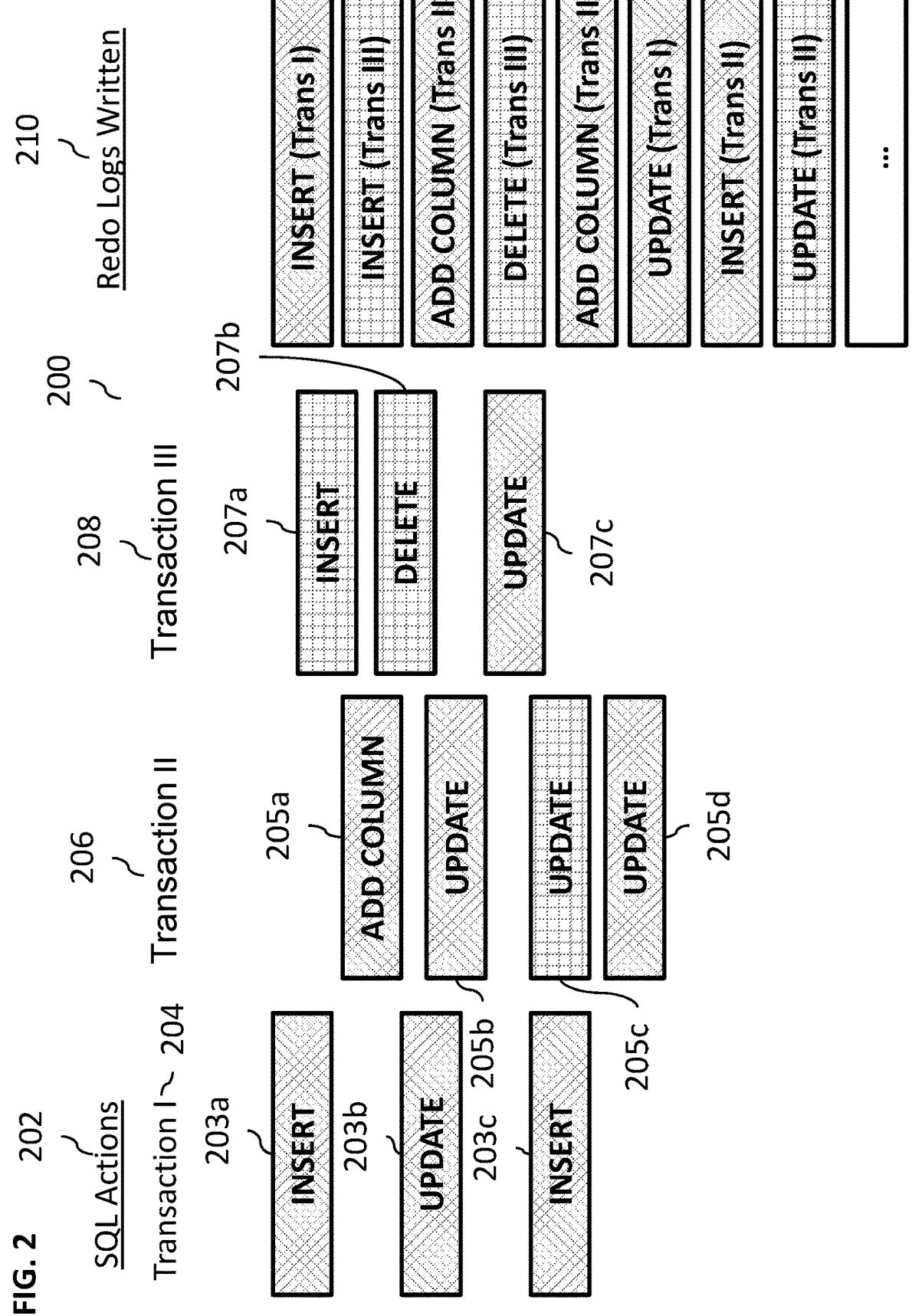
FIG. 2 illustrates an exemplary process for generating of redo logs for various transactions, according to some implementations of the current subject matter.

FIG. 2 illustrates an exemplary process 200 for generating of redo logs for various transactions, according to some implementations of the current subject matter. The process 200 may collect logs from various transactions that may be performed on one or more tables in the database system and write them into a single stream 210. As shown in FIG. 2, execution of actions 202 (e.g., SQL action) on tables stored in the database system (e.g., system 100 shown in FIG. 1) may include one or more transactions groups I-III 204-208. The transactions 204-208 may be executed on different tables (e.g., Table 1, Table 2). For example, transactions INSERT 203a, UPDATE 203b, INSERT 203c may be part of the group I 204 and executed on Table 1. The transactions 203 may be executed one after the other and/or in any desired order. Transactions 205 (a, b, c, d) may be part of group II 206. However, transactions ADD COLUMN 205a, UPDATE 205b, and UPDATE 205d are executed on the same Table 1, while transaction UPDATE 205c may be executed on another table—Table 2. The timing of execution of transactions 205 may be different or same than timing of transactions in group I 204. The transactions 207 (a, b, c) may be part of group III 208 and may be executed at different or same times as transactions in groups I and II. Transactions INSERT 207a and DELETE 207b may be applied to the second table and transaction UPDATE 207c may be applied to the first table. In some implementations, transaction groups I-III 204-208 may be executed in parallel (even though the timing of execution of each specific transaction may vary). Execution of transactions may be dependent on the arrangement of data in tables, dependencies among various data within tables and/or across tables, and/or any other factors.

The system 100 may be configured to generate redo logs and write them to one or more memory locations of the system 100. The generation of redo logs may be based on the timing of execution of each transaction in groups I-III 204-208. As shown in FIG. 2, the redo log 210 may be written using redo handler component 110 (as shown in FIG. 1) in the following order: INSERT (Transaction I 203a; Table 1), INSERT (Transaction III 207a, Table 2), ADD COLUMN (Transaction II 205a, Table 1), DELETE (Transaction III 207b, Table 2), ADD COLUMN (Transaction II 205a, Table 1), UPDATE (Transaction I 203b, Table 1), UPDATE (Transaction II 205b, Table 1), and so on.

Generation of logs and subsequent replaying of the logs may be time consuming. To speed up logreplay, the stream of all redo logs may be assigned to different queues (e.g., recovery-queues) that may then be processed in parallel. The assignment of redo log to queues may be performed by a recovery handler and may be based on top-level information in each redo log, e.g., a header of the redo log. The header of the redo log may also provide information by which redo handler 110 of the system 100 a particular redo record may need to be processed. For example, redo records of the same portion of a table may always be replayed on the same recovery queue, and redo records written by the column store (CS) component 114 may be replayed by a redo handler component for the column store.

Execution of logreplay may depend on the recorded redo records. As soon as the records are written, logreplay processes may be executed without many possibilities to interact between test execution and logreplay. During logreplay, the database system may be placed in a special state, where, for example, no interaction (e.g., via SQL) may be possible (with some exceptions for Active/Active) among various components. Further, many logreplay tests may be time-consuming because they have to operate on a full database system, while the system is online, which causes system processes to stop executing in order to enter logreplay mode. It may also be difficult to test logreplay of older versions of redo records, and/or corrupted/malformed redo records. Thus, to reduce the time for testing of logreplay records, the current subject matter may implement the internal testing framework (DBCreator).

In some implementations, the current subject matter may implement a database creator framework 108 (as shown in FIG. 1) that may perform redo callbacks and/or redo injection. To perform redo callbacks, the current subject matter system may perform registration of arbitrary actions within execution of database creator framework's test functionalities. In some implementations, for the purposes of registration, the database creator framework 108 may include the interface 116 that may be configured to register a particular action for execution (i.e., "call back") at an arbitrary point during a record recovery operation. A registration for an execution of such action (also referred to "DirectRedoCallback") may also specify the recovery queue on which the action may be executed.

Figure 3:
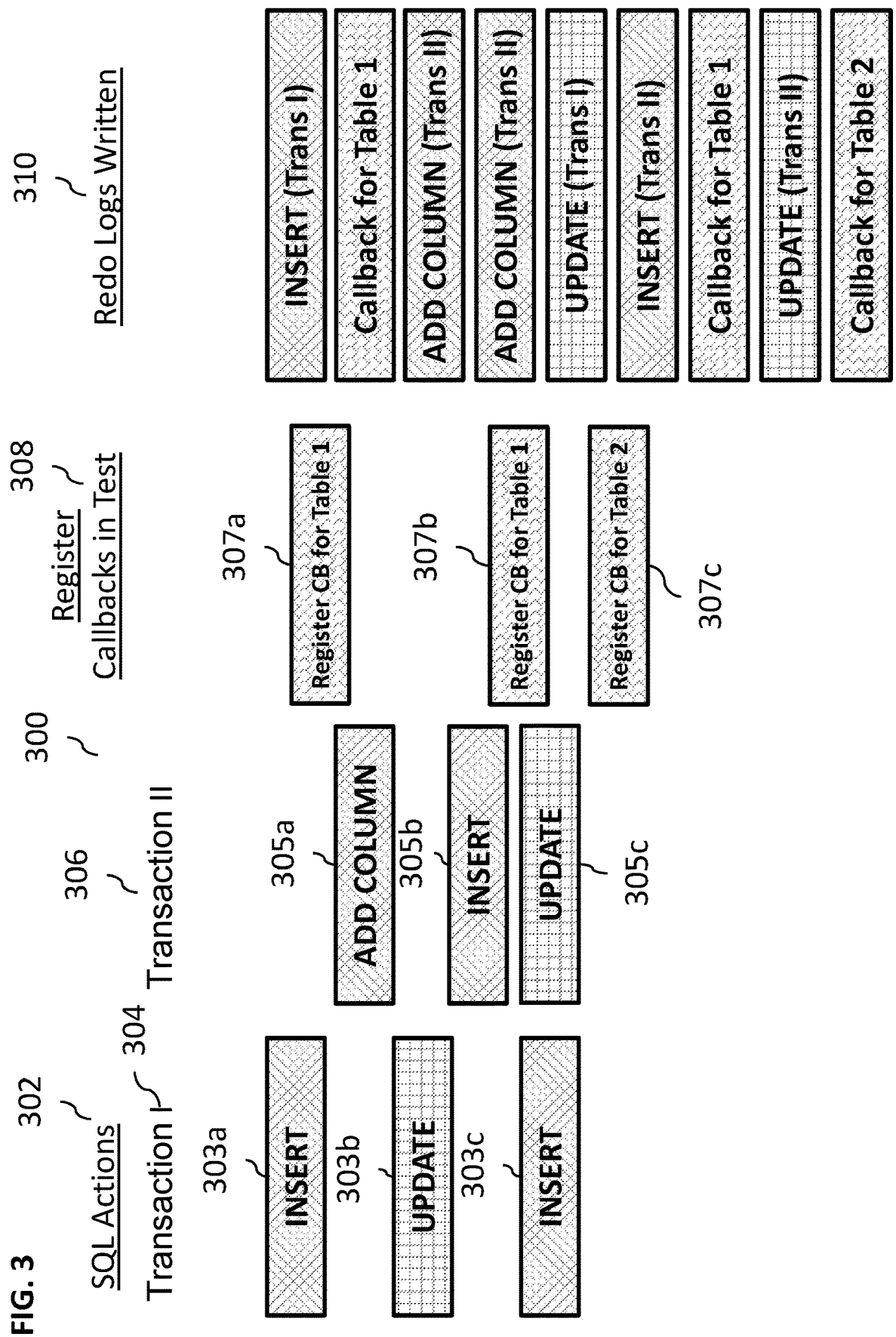
FIG. 3 illustrates an exemplary process for registration of callbacks for recovery, according to some implementations of the current subject matter.

FIG. 3 illustrates an exemplary process 300 for registration of callbacks for recovery, according to some implementations of the current subject matter. Similar to the process 200, process 300 may collect logs from various transactions that may be performed on one or more tables in the database system and write them into a single stream 310. As shown in FIG. 3, execution of actions 302 (e.g., SQL action) on tables stored in the database system (e.g., system 100 shown in FIG. 1) may include one or more transactions groups I-II 304-306. The transactions 304-306 may be executed on different tables. For example, transactions INSERT 303a, UPDATE 303b, INSERT 303c may be part of the group I 304, where transactions 303a and 303c are executed on Table 1 and transaction 303b is executed on Table 2. The transactions 303 may be executed one after the other and/or in any desired order. Transactions 305 (a, b, c) may be part of group II 306. Transactions ADD COLUMN 305a and INSERT 305b may be executed on the Table 1, and transaction UPDATE 305c may be executed on the Table 2. The timing of execution of transactions 305 may be different or same than the timing of execution of transactions in group I 304.

The process 300 may also implement use of an additional redo handler component 112, which may perform test execution of registered actions (e.g., "TestRedoController"). The redo controller may determine whether a callback ("CB") is registered using the interface 116 in the system 100. If so, a redo entry is written for execution of a registered callback action. The registered callback actions may include, by way of a non-limiting example, at least one of the following: unload a table, produce table out of memory, start table load from another location, and/or any other actions, and/or any combination thereof.

As shown in FIG. 3, using interface 116, callback actions 308 may be registered for Tables 1 and 2, which received various modification actions during transactions 304-306. For example, callbacks 307a and 307b may be registered for Table 1 and callback 307c may be registered for Table 2. The callbacks may be registered at different times, as shown in FIG. 3. In some implementations, transaction groups I-II 304-306 and callback registration 308 may be executed in parallel (even though the timing of execution of each specific transaction may vary). Execution of transactions may be dependent on the arrangement of data in tables, dependencies among various data within tables and/or across tables, and/or any other factors.

The redo logs 310 may be written to one or more memory locations of the system 100. The generation of redo logs 310 may be based on the timing of execution of each transaction in groups I-II 304-306 as well as the registration of callbacks 308. As shown in FIG. 3, the redo log 310 may be written using redo handler component 110 (as shown in FIG. 1) in the following order: INSERT (Transaction I 303a; Table 1), callback for Table 1, ADD COLUMN (Transaction II 305a, Table 1), ADD COLUMN (Transaction II 305a, Table 1), UPDATE (Transaction I 303b, Table 2), INSERT (Transaction II 305b, Table 1), callback for Table 1, UPDATE (Transaction II 305c, Table 2), and callback for Table 2.

In some implementations, the redo handler 112 (i.e. "TestRedoController") may handle specific redo records representing execution of a registered action during test execution. These special redo records may be generated within the test, whenever a DirectRedoCallback action is registered. Subsequently, during logreplay, the action may be referred to in the redo record as executed by the "TestRedoController". Some examples of DirectRedoCallbacks may include at least one of the following: Unload/Load a particular table at a certain time during logreplay to provoke critical/unusual situation, artificially provoke a critical memory situation (e.g., out of memory), lock a particular table, and/or any other actions, and/or any combinations thereof.

Figure 4:
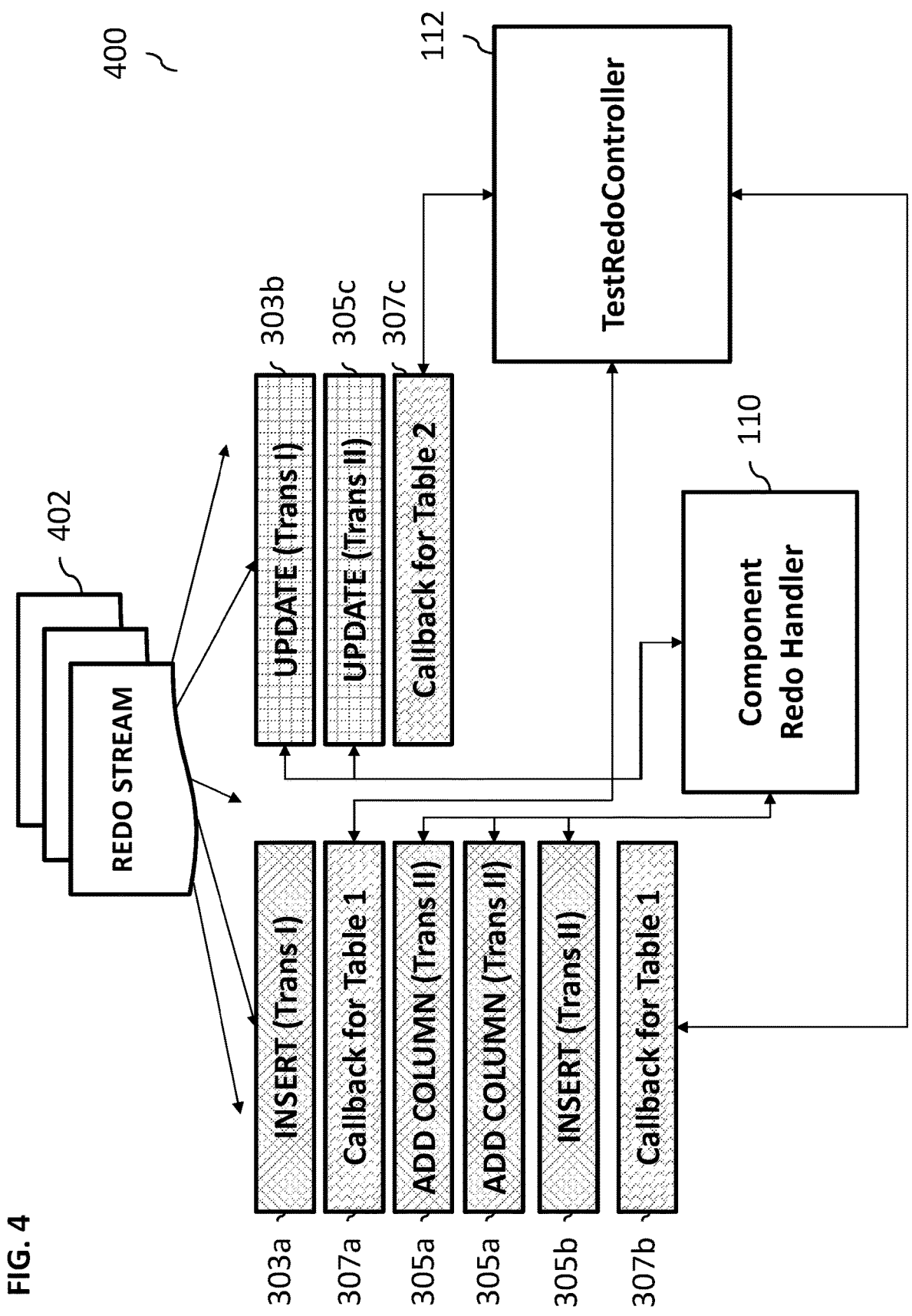
FIG. 4 illustrates an exemplary process for executing the above special redo handler, according to some implementations of the current subject matter.

FIG. 4 illustrates an exemplary process 400 for executing the above special redo handler, according to some implementations of the current subject matter. The process 400 illustrates execution of a parallelized log replay in different execution queues of various actions associated with modifications of Tables 1 and 2 as well as registration and callbacks associated with any redo actions for Tables 1 and 2 (as shown in FIG. 3). The process 400 may be implemented using one or more queues, where at least one table may be mapped to the same queue. Further, based on the type of redo entry, a different redo handler 112 may be used to handle (e.g., execute it).

As shown in FIG. 4, the redo entries during execution of process 400 may be performed by the redo handler (i.e., "TestRedoController") 112 and the Component Redo Handler 110. During process 400, a stream 402 of redo actions may be received by the system 100. The redo actions in the stream 402 may be destined for either redo handler 110 and/or redo handler 112.

In some implementations, the Component Redo Handler 110 may be assigned to execute all table modification actions (e.g., INSERT 303a, ADD COLUMN 305a, INSERT 305b, UPDATE 303b, and UPDATE 305c) regardless of the queues that these actions are being placed in for redo testing purposes. The redo handler 112 may be specifically designated for execution of redo of callback actions. As such, the redo handler 112 may be configured to execute callback actions for Table 1 307a and 307b as well as callback actions for Table 2 307c. In some implementations, the redo handler 112 may check initialization parameters of a particular callback action to ensure that they are correct and hence, may be appropriately executed.

In some implementations, the current subject matter system may also perform replacement and/or modification of original redo records during log replay actions in addition injection of new actions (e.g., callback). This may be useful for the purposes of skipping of original redo records, changing of the order of original redo records, detection of malformed original redo records, removal of parts/information within a redo record, and/or for any other purposes.

In some implementations, to perform replacement and/or modification of original redo records, the interface 116 may be used for sub scribing/unsubscribing of particular actions that may be executed instead of invoking the existing Component Redo Handler (e.g., redo handler 110 shown in FIGS. 1 and 4). There are two callbacks that may be used within database creator test to subscribe and then unsubscribe such action for a particular table.

To register for a redo modification during online processing, the current subject matter may install another redo handler 118 for performing test execution—"Component Test Redo Handler". Then, all column store redo logs may be passed to the redo handler 118. The current subject matter system may then determine based on whether an action was subscribed, whether that action is executed or the original redo handler 110 should be called. In some implementations, the current subject matter may perform test subscribing/unsubscribing for modification of column store records for at least one of the following actions that may require corrections: flip bits, skipping of redo records, reshuffling of different redo records, modification of redo records to make it wrong (e.g., an old version of the record), and/or for any other purposes.

Figure 5:
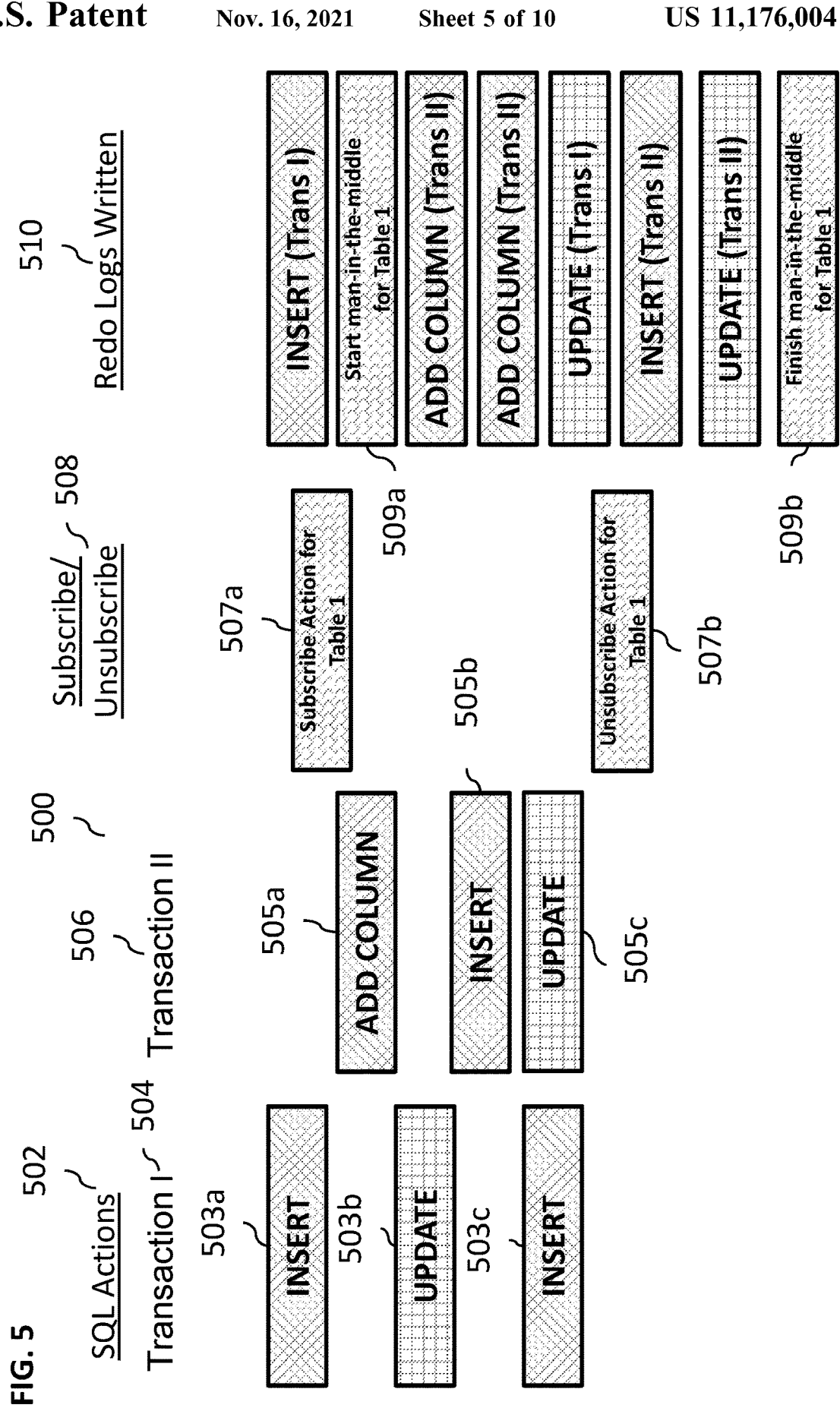
FIG. 5 illustrates an exemplary process for registering for redo modification of table records during online processing, according to some implementations of the current subject matter.

FIG. 5 illustrates an exemplary process 500 for registering for redo modification of table records during online processing, according to some implementations of the current subject matter. Similar to the processes discussed above, the process 500 may collect logs from various transactions that may be performed on one or more tables in the database system and write them into a single stream 510. As shown in FIG. 5, execution of actions 502 (e.g., SQL action) on tables stored in the database system (e.g., system 100 shown in FIG. 1) may include one or more transactions groups I-II 504-506. The transactions 504-506 may be executed on records of different tables (e.g., Table 1 and Table 2). For example, transactions INSERT 503a, and INSERT 503c may be part of the group I 504 and may be executed on Table 1, whereas UPDATE 503b, also part of group I 504, may be executed on Table 2. Similar to the discussion above, transactions 503 may be executed one after the other and/or in any desired order. Transactions 505 (a, b, c) may be part of group II 506, where transaction ADD COLUMN 505a and INSERT 505b may be executed on Table 1, and transaction UPDATE 305c may be executed on Table 2.

The redo logs 510 may be written to one or more memory locations of the system 100. The generation of redo logs 510 may be based on the timing of execution of each transaction in groups I-II 504-506 as well as the subscription/unsubscription 508. As shown in FIG. 5, the redo log 510 may be written using redo handler 110 (as shown in FIG. 1) in the following order: INSERT (Transaction I 503a; Table 1), start of the man-in-the-middle for Table 1 509a, ADD COLUMN (Transaction II 505a, Table 1), ADD COLUMN (Transaction II 505a, Table 1), UPDATE (Transaction I 503b, Table 2), INSERT (Transaction II 505b, Table 1), UPDATE (Transaction II 505c, Table 2), and finish the man-in-the-middle for Table 1 509b.

As stated above, the process 500 may implement use of an additional redo handler—Component Test Redo Handler 118, which may perform subscription/un-subscription of various actions. The redo handler 118 may be used to subscribe for actions on Table 1, at 507a, and to unsubscribe, at 507b. The interface 116 in the system 100 may be used for the purposes of subscription/un-subscription. If an action is subscribed, when written redo logs 510 are replayed, the subscribed action is executed, at 509a. The execution of the subscribed action is finished, when the redo handler 118 encounters an appropriate indication 509b.

As shown in FIG. 5, using interface 116, subscription/unsubscription actions 508 may be subscribed/unsubscribed for the Tables 1 and 2 (Table 1 subscription/un-subscription is shown in FIG. 5). The subscription/un-subscription may be performed at different times for each table. During execution, at first, all column store redo records may be passed to the redo handler 118 instead of the redo handler 110. The redo handler 118 may check with the TestRedoController 112 if there is an active subscription for logs in the recovery queue. If no action is subscribed, then a column store redo record may be passed to the redo handler 110 for processing. However, if an action is subscribed, a registered user-defined action (e.g., modify, delete, insert, etc.) may be processed by the redo handler 118, which then executes that user-defined action.

Figure 6:
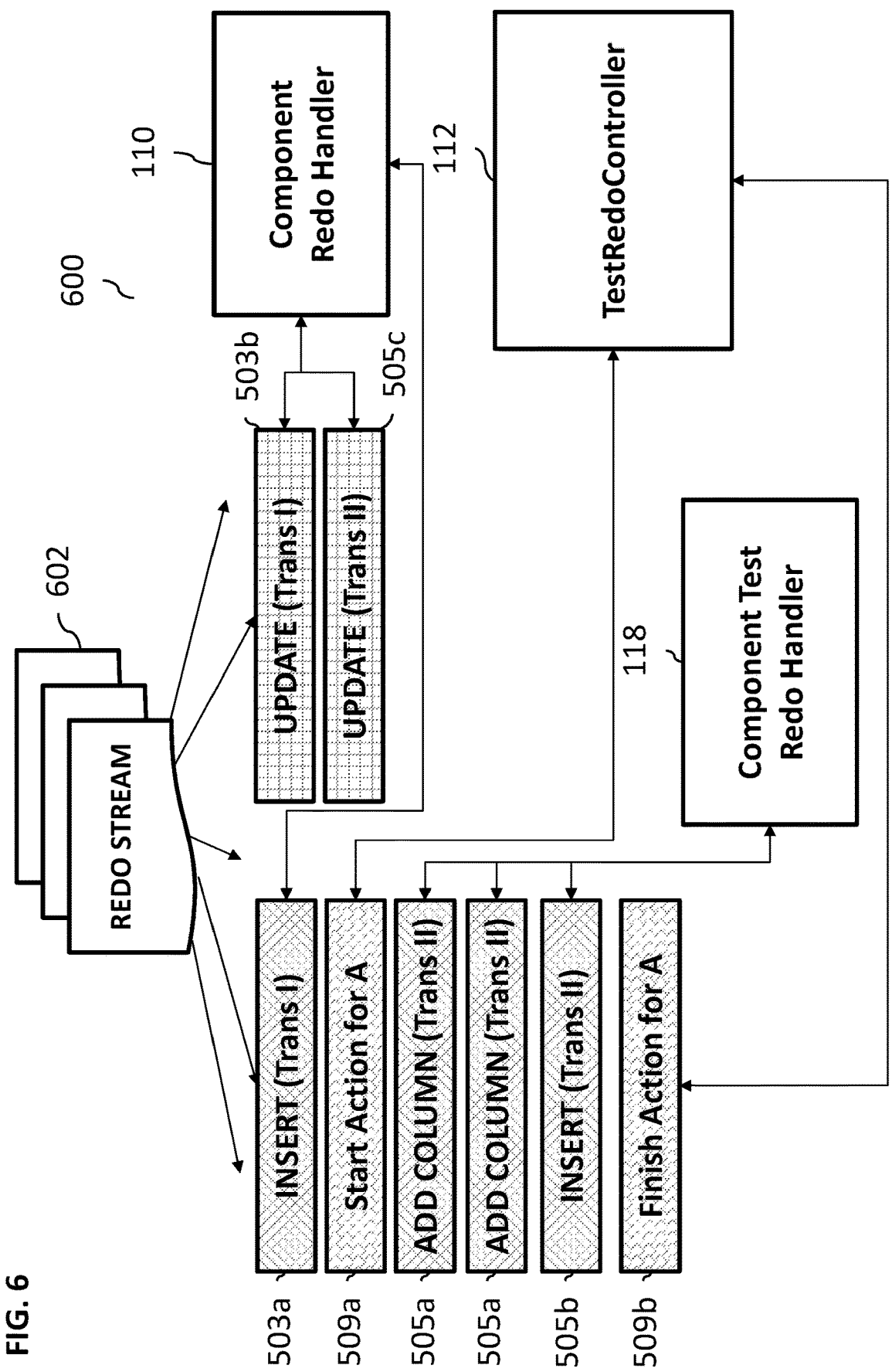
FIG. 6 illustrates an exemplary process for executing a redo handler shown in FIG. 1, according to some implementations of the current subject matter.

FIG. 6 illustrates an exemplary process 600 for executing the redo handler 118 (shown in FIG. 1), according to some implementations of the current subject matter. The process 600 illustrates execution of a parallelized log replay in different execution queues of various actions associated with modifications of Tables 1 and 2 as well as determination of whether subscription to a particular action exists and should be executed with regard to one or more Tables 1 and 2. Based on the type of redo entry, a different redo handler 110, 112, 118 may be used to handle (e.g., execute it).

As shown in FIG. 6, a stream 602 of redo actions may be received by the system 100. The redo actions in the stream 602 may be first processed by the TestRedoController 112 to determine whether a subscription to a particular action exists. If not, then the redo handler 110 processes the redo actions. Otherwise, the redo handler 118 performs the specific action that is being subscribed to.

In some implementations, the redo handler 110 may be assigned to execute all table modification actions (e.g., INSERT 503a, UPDATE 503b, and UPDATE 505c). The redo handler 112 may register any actions that are being subscribed to (e.g., start action for Table 1 509a and finish action for Table 1 509b). The redo handler 118 may then execute actions for which subscription is determined in connection with Table 1. For example, a subscribed action may modify an original record and call the redo handler 110.

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 7:
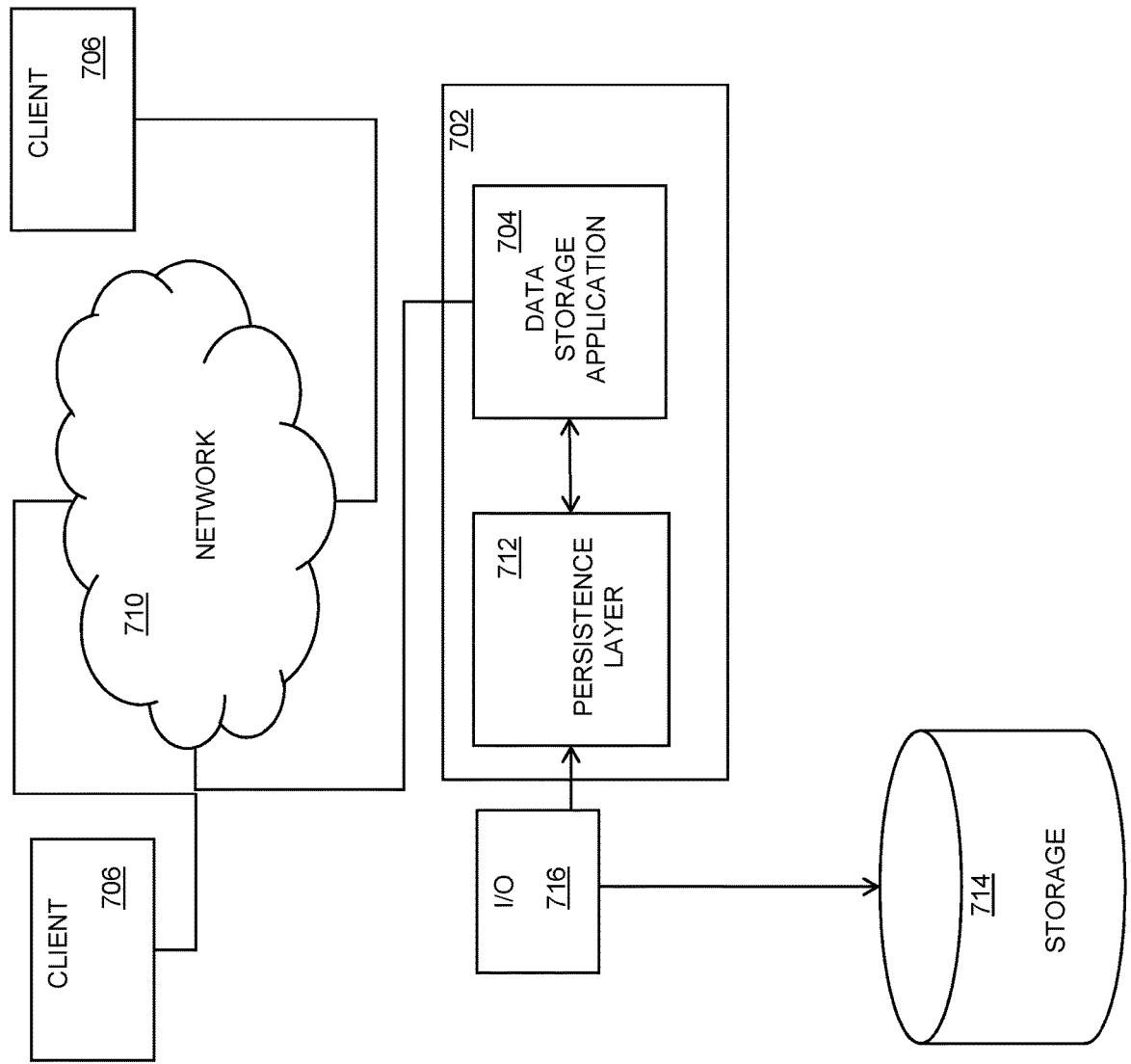
FIG. 7 is a diagram illustrating an exemplary system including a data storage application, according to some implementations of the current subject matter.

FIG. 7 illustrates an exemplary system 700 in which a computing system 702, which can include one or more programmable processors that can be collocated, linked over one or more networks, etc., executes one or more modules, software components, or the like of a data storage application 704, according to some implementations of the current subject matter. The data storage application 704 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 702 as well as to remote users accessing the computing system 702 from one or more client machines 706 over a network connection 710. One or more user interface screens produced by the one or more first modules can be displayed to a user, either via a local display or via a display associated with one of the client machines 706. Data units of the data storage application 704 can be transiently stored in a persistence layer 712 (e.g., a page buffer or other type of temporary persistency layer), which can write the data, in the form of storage pages, to one or more storages 714, for example via an input/output component 716. The one or more storages 714 can include one or more physical storage media or devices (e.g. hard disk drives, persistent flash memory, random access memory, optical media, magnetic media, and the like) configured for writing data for longer term storage. It should be noted that the storage 714 and the input/output component 716 can be included in the computing system 702 despite their being shown as external to the computing system 702 in FIG. 7.

Data retained at the longer term storage 714 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 8:
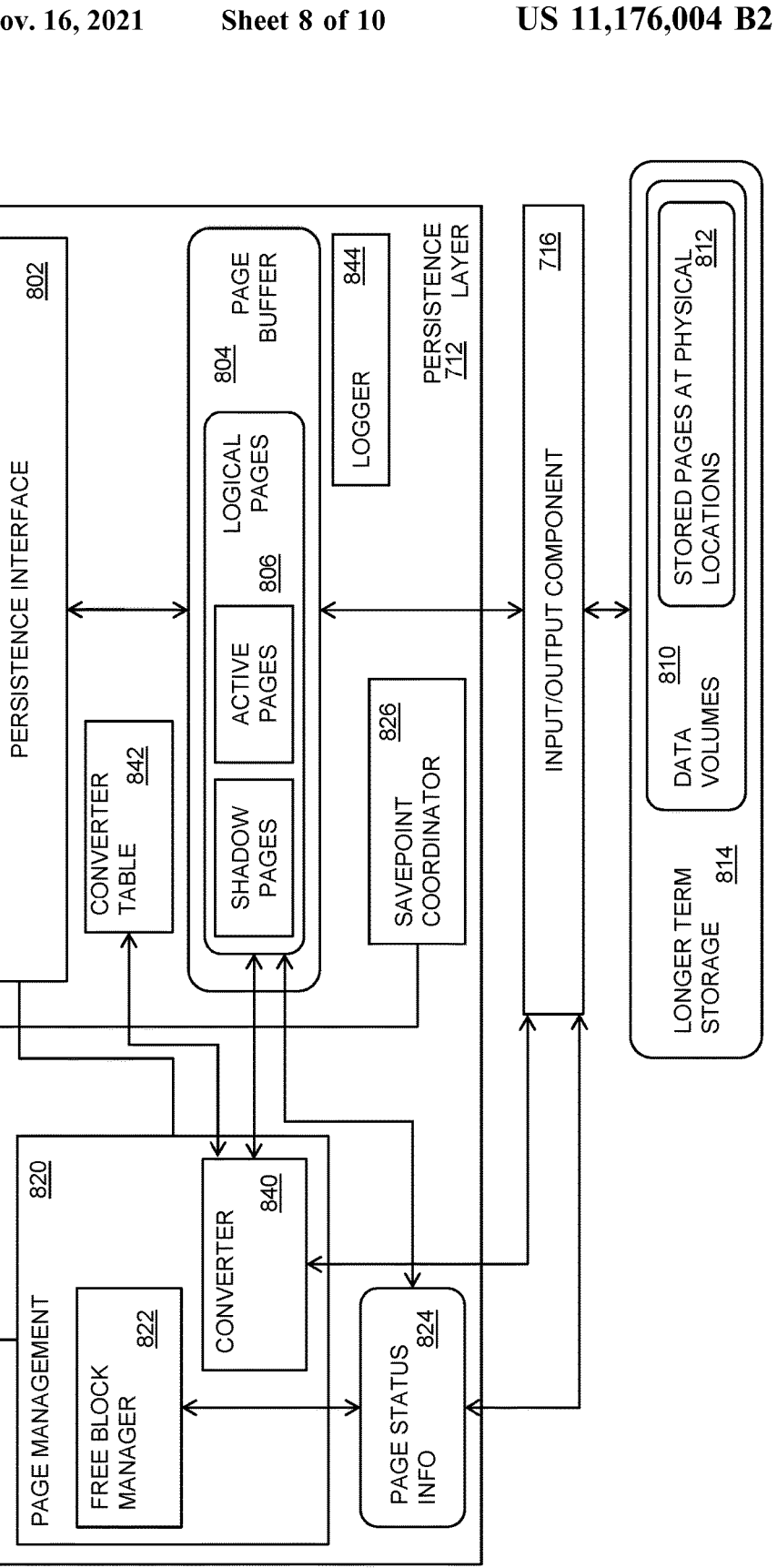
FIG. 8 is a diagram illustrating details of the system of FIG. 7.

FIG. 8 illustrates exemplary software architecture 800, according to some implementations of the current subject matter. A data storage application 704, which can be implemented in one or more of hardware and software, can include one or more of a database application, a network-attached storage system, or the like. According to at least some implementations of the current subject matter, such a data storage application 704 can include or otherwise interface with a persistence layer 712 or other type of memory buffer, for example via a persistence interface 802. A page buffer 804 within the persistence layer 712 can store one or more logical pages 806, and optionally can include shadow pages, active pages, and the like. The logical pages 806 retained in the persistence layer 712 can be written to a storage (e.g. a longer term storage, etc.) 714 via an input/output component 716, which can be a software module, a sub-system implemented in one or more of software and hardware, or the like. The storage 714 can include one or more data volumes 810 where stored pages 812 are allocated at physical memory blocks.

In some implementations, the data storage application 704 can include or be otherwise in communication with a page manager 814 and/or a savepoint manager 816. The page manager 814 can communicate with a page management module 820 at the persistence layer 712 that can include a free block manager 822 that monitors page status information 824, for example the status of physical pages within the storage 714 and logical pages in the persistence layer 712 (and optionally in the page buffer 804). The savepoint manager 816 can communicate with a savepoint coordinator 826 at the persistence layer 712 to handle savepoints, which are used to create a consistent persistent state of the database for restart after a possible crash.

In some implementations of a data storage application 704, the page management module of the persistence layer 712 can implement a shadow paging. The free block manager 822 within the page management module 820 can maintain the status of physical pages. The page buffer 804 can include a fixed page status buffer that operates as discussed herein. A converter component 840, which can be part of or in communication with the page management module 820, can be responsible for mapping between logical and physical pages written to the storage 714. The converter 840 can maintain the current mapping of logical pages to the corresponding physical pages in a converter table 842. The converter 840 can maintain a current mapping of logical pages 806 to the corresponding physical pages in one or more converter tables 842. When a logical page 806 is read from storage 714, the storage page to be loaded can be looked up from the one or more converter tables 842 using the converter 840. When a logical page is written to storage 714 the first time after a savepoint, a new free physical page is assigned to the logical page. The free block manager 822 marks the new physical page as "used" and the new mapping is stored in the one or more converter tables 842.

The persistence layer 712 can ensure that changes made in the data storage application 704 are durable and that the data storage application 704 can be restored to a most recent committed state after a restart. Writing data to the storage 714 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 844 can also be included to store the changes made to the data of the data storage application in a linear log. The logger component 844 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 844 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 712 can use a combination of undo log entries (from one or more logs) and shadow paging.

The persistence interface 802 can handle read and write requests of stores (e.g., in-memory stores, etc.). The persistence interface 802 can also provide write methods for writing data both with logging and without logging. If the logged write operations are used, the persistence interface 802 invokes the logger 844. In addition, the logger 844 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 844. For an entry of type "update", for example, this would be the identification of the affected record and the after image of the modified data.

When the data application 704 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 844 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 844 can write a database log (or simply referred to herein as a "log") sequentially into a memory buffer in natural order (e.g., sequential order, etc.). If several physical hard disks/storage devices are used to store log data, several log partitions can be defined. Thereafter, the logger 844 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 704 can use shadow paging so that the savepoint manager 816 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 9:
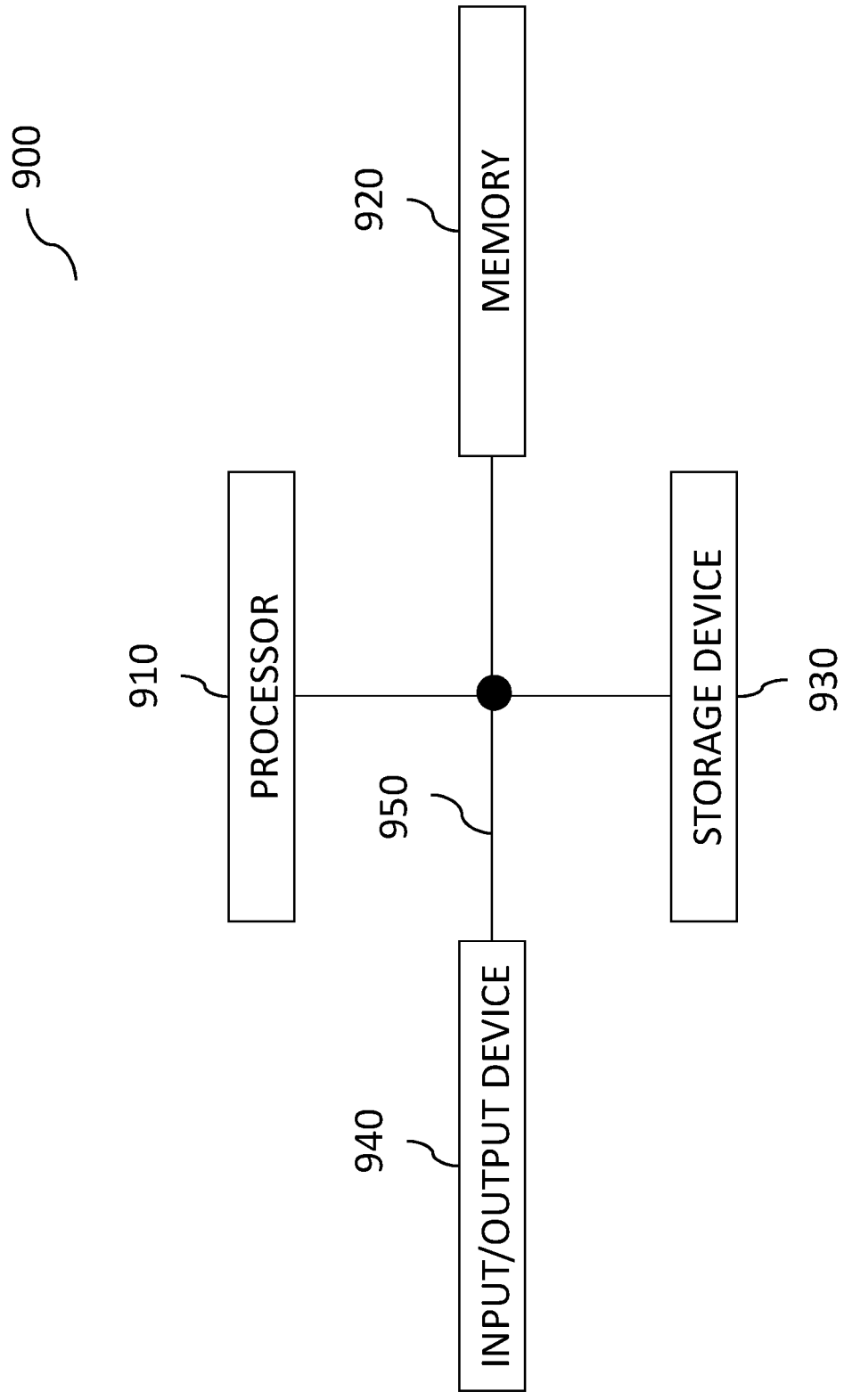
FIG. 9 is an exemplary system, according to some implementations of the current subject matter.

In some implementations, the current subject matter can be configured to be implemented in a system 900, as shown in FIG. 9. The system 900 can include a processor 910, a memory 920, a storage device 930, and an input/output device 940. Each of the components 910, 920, 930 and 940 can be interconnected using a system bus 950. The processor 910 can be configured to process instructions for execution within the system 900. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit.

The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

Figure 10:
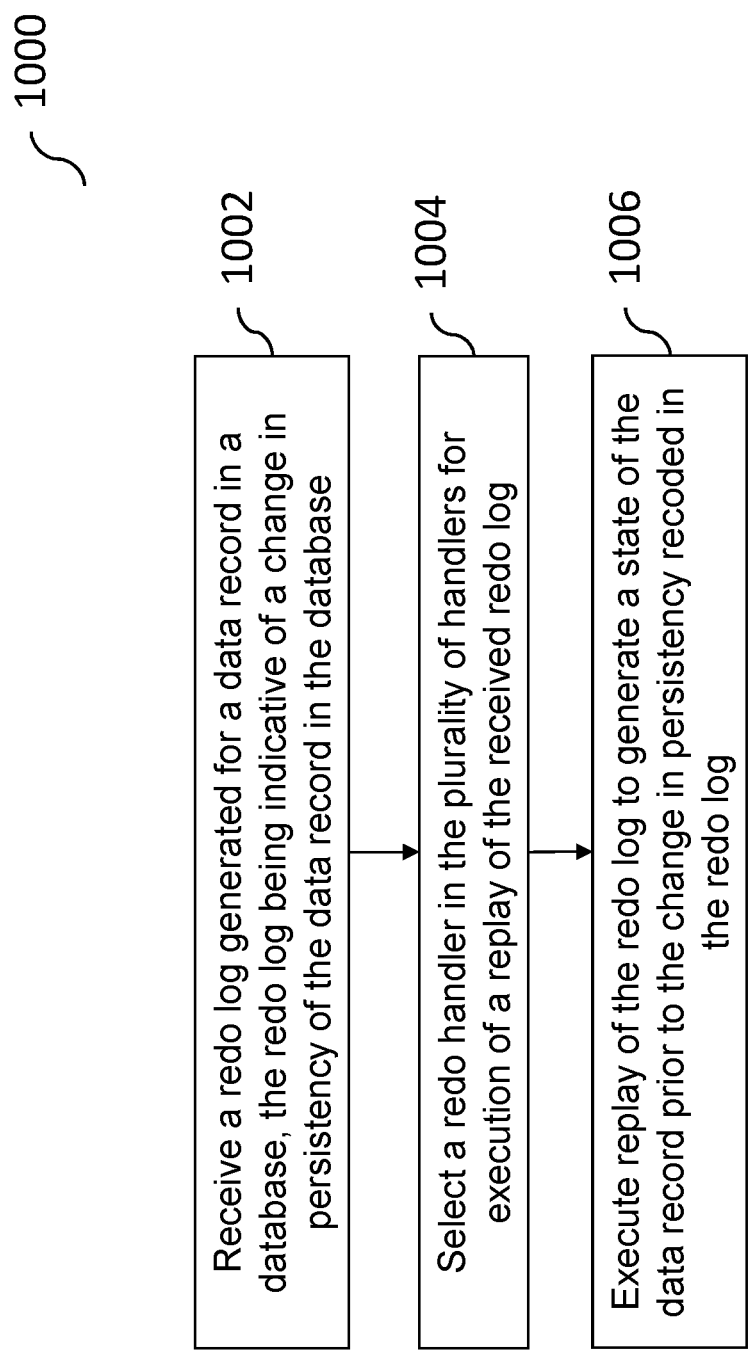
FIG. 10 is an exemplary method, according to some implementations of the current subject matter.

FIG. 10 illustrates an exemplary method 1000 for performing logreplay in a database system, according to some implementations of the current subject matter. At 1002, a redo log (e.g., a stream of redo logs as shown in FIGS. 4 and 6) generated for one or more data records in a database system (e.g., system 100 shown in FIG. 1) may be received. The redo log may indicate a change in persistency of one or more data records in the database. At 1004, based on the change in persistency recorded in the redo log, a redo handler (e.g., a Component Redo Handler 110, a TestRedo-Controller 112, or a Component Test Redo Handler 118) in the plurality of handlers may be selected for execution of a replay of the received redo log. At 1006, using the selected redo log, replay of the redo log may be executed to generate a state of the data record prior to the change in persistency recoded in the redo log.

In some implementations, the current subject matter can include one or more of the following optional features. The data record may be a table (e.g., Table 1, Table 2 as discussed in connection with FIGS. 2-6) in the database. The change in persistency may include at least one of the following actions: a modification of the data record, an insertion of the data record, a deletion of the data record, an addition of a column to the data record, and any combination thereof.

In some implementations, the change in persistency may include a registered action for a predetermined table stored in the database that may be performed at an arbitrary point in time during recovery of the predetermined table. Then, the selection of a particular handler may include selecting a first redo handler (e.g., Component Redo Handler 112) to perform the registered action on the predetermined table. A second redo handler may be selected to perform any other non-registered actions.

In some implementations, the registered action may include at least one of the following: a loading of the predetermined table, an unloading of the predetermined table, a locking of the predetermined table, and any combination thereof. The selection of a redo handler may further include selecting the second redo handler (e.g., redo handler 118) to perform an additional action not contained in the received redo log. A third redo handler (e.g., redo handler 110) may be selected to perform all other actions in the received redo log. The additional action may include at least one of the following: skipping one or more received redo records, changing order of one or more received redo records, modifying one or more received redo records, deleting at least a portion of one or more received redo records, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   receiving a redo log generated for a data record in a database, the redo log being indicative of a change in persistency of the data record in the database, wherein the data record is a table in the database, and the change in persistency includes at least one of the following actions: a modification of the data record, an insertion of the data record, a deletion of the data record, an addition of a column to the data record, and any combination thereof;
   selecting, based on the change in persistency recorded in the redo log, a test redo handler in the plurality of redo handlers for a test execution of a replay of the received redo log, wherein another version of the data record in the database is created for the test execution; and
   test executing, using the selected test redo log handler, a replay of the redo log to generate a state of the data record prior to the change in persistency recoded in the redo log, the replay including test executing one or more registered actions in the redo log based on a determination of a subscription of the one or more registered actions;
   wherein the change in persistency includes a registered action for a predetermined table stored in the database performed at an arbitrary point in time during recovery of the predetermined table;
   wherein the selecting includes selecting a first redo handler in the plurality of redo handlers to perform the registered action on the predetermined table, and selecting a second redo handler in the plurality of redo handlers to perform non-registered actions.

2. The method according to claim 1, wherein the registered action includes at least one of the following: a loading of the predetermined table, an unloading of the predetermined table, a locking of the predetermined table, and any combination thereof.

3. The method according to claim 1, wherein the selecting further comprises
   selecting the second redo handler to perform an additional action not contained in the received redo log; and
   selecting a third redo handler in the plurality of redo handlers to perform all other actions in the received redo log.

4. The method according to claim 3, wherein the additional action includes at least one of the following: skipping one or more received redo records, changing order of one or more received redo records, modifying one or more received redo records, deleting at least a portion of one or more received redo records, and any combination thereof.

5. A system comprising:
   at least one programmable processor; and
   a non-transitory machine-readable medium storing instructions that, when executed by the at least one programmable processor, cause the at least one programmable processor to perform operations comprising:
   receiving a redo log generated for a data record in a database, the redo log being indicative of a change in persistency of the data record in the database, wherein the data record is a table in the database, and the change in persistency includes at least one of the following actions: a modification of the data record, an insertion of the data record, a deletion of the data record, an addition of a column to the data record, and any combination thereof;
   selecting, based on the change in persistency recorded in the redo log, a test redo handler in the plurality of redo handlers for a test execution of a replay of the received redo log, wherein another version of the data record in the database is created for the test execution; and
   test executing, using the selected test redo log handler, a replay of the redo log to generate a state of the data record prior to the change in persistency recoded in the redo log, the replay including test executing one or more registered actions in the redo log based on a determination of a subscription of the one or more registered actions;

wherein the change in persistency includes a registered action for a predetermined table stored in the database performed at an arbitrary point in time during recovery of the predetermined table;

wherein the selecting includes selecting a first redo handler in the plurality of redo handlers to perform the registered action on the predetermined table, and selecting a second redo handler in the plurality of redo handlers to perform non-registered actions.

6. The system according to claim 5, wherein the registered action includes at least one of the following: a loading of the predetermined table, an unloading of the predetermined table, a locking of the predetermined table, and any combination thereof.

7. The system according to claim 5, wherein the selecting further comprises
selecting the second redo handler to perform an additional action not contained in the received redo log; and
selecting a third redo handler in the plurality of redo handlers to perform all other actions in the received redo log.

8. The system according to claim 7, wherein the additional action includes at least one of the following: skipping one or more received redo records, changing order of one or more received redo records, modifying one or more received redo records, deleting at least a portion of one or more received redo records, and any combination thereof.

9. A computer program product comprising a non-transitory machine-readable medium storing instructions that, when executed by at least one programmable processor, cause the at least one programmable processor to perform operations comprising:
receiving a redo log generated for a data record in a database, the redo log being indicative of a change in persistency of the data record in the database, wherein the data record is a table in the database, and the change in persistency includes at least one of the following actions: a modification of the data record, an insertion of the data record, a deletion of the data record, an addition of a column to the data record, and any combination thereof;
selecting, based on the change in persistency recorded in the redo log, a test redo handler in the plurality of redo handlers for a test execution of a replay of the received redo log, wherein another version of the data record in the database is created for the test execution; and
test executing, using the selected test redo log handler, a replay of the redo log to generate a state of the data record prior to the change in persistency recoded in the redo log, the replay including test executing one or more registered actions in the redo log based on a determination of a subscription of the one or more registered actions;

wherein the change in persistency includes a registered action for a predetermined table stored in the database performed at an arbitrary point in time during recovery of the predetermined table;

wherein the selecting includes selecting a first redo handler in the plurality of redo handlers to perform the registered action on the predetermined table, and selecting a second redo handler in the plurality of redo handlers to perform non-registered actions.

10. The computer program product according to claim 9, wherein the registered action includes at least one of the following: a loading of the predetermined table, an unloading of the predetermined table, a locking of the predetermined table, and any combination thereof.

11. The computer program product according to claim 9, wherein the selecting further comprises
selecting the second redo handler to perform an additional action not contained in the received redo log; and
selecting a third redo handler in the plurality of redo handlers to perform all other actions in the received redo log.

* * * * *